United States Patent
Murakami et al.

[11] Patent Number: 5,728,445
[45] Date of Patent: Mar. 17, 1998

[54] FASTENING MEMBER

[75] Inventors: Yuichi Murakami; Toshiyuki Suzuki; Takuo Hasegawa; Mitsuhiko Sato; Nobuyuki Suzumura, all of Tokyo, Japan

[73] Assignee: Research Institute of Advanced Material Gas-Generator, Ltd., Tokyo, Japan

[21] Appl. No.: 580,484

[22] Filed: Dec. 29, 1995

[30] Foreign Application Priority Data

Jan. 5, 1995 [JP] Japan .................. 7-000219

[51] Int. Cl.$^6$ .................................................. F16B 1/00
[52] U.S. Cl. .................. 428/113; 428/293.4; 428/293.7; 411/327; 411/427; 411/904; 411/906; 411/908; 156/89; 24/58; 24/67
[58] Field of Search ................... 428/113, 284, 428/285, 288, 289, 293.4, 293.7; 411/378, 427, 904, 906, 908; 156/89; 264/58, 67

[56] References Cited

U.S. PATENT DOCUMENTS 4,268,562  5/1981  Bacon et al. ..................... 428/113
5,080,547  1/1992  Moghe ............................ 411/436
5,506,018  4/1996  Jacob et al. ..................... 428/113

FOREIGN PATENT DOCUMENTS 0 317 129   5/1989  European Pat. Off. .
0 431 301   6/1991  European Pat. Off. .
2 283 294   5/1995  United Kingdom .
WO 91/11633 8/1991  WIPO .

Primary Examiner—Marion E. McCamish
Assistant Examiner—Elizabeth M. Cole
Attorney, Agent, or Firm—Young & Thompson

[57] ABSTRACT

A fastening member is formed from a fiber-reinforced ceramic composite material, in which a ceramic material is reinforced with a plurality of inorganic long fibers. The inorganic long fibers are located in the ceramic material such that first orientated layers, in which the inorganic long fibers are orientated in a predetermined direction, and second orientated layers, in which the inorganic long fibers are orientated in a direction different from the direction of orientation of the inorganic long fibers in the first orientated layers, may be laminated alternately.

7 Claims, 3 Drawing Sheets

FASTENING MEMBER

BACKGROUND OF THE INVENTION

1. [Field of the Invention]

This invention relates to a fastening member. This invention particularly relates to a fastening member, which has a high heat resistance, a high corrosion resistance, and good mechanical characteristics, and is useful in various fields, such as aviation, cosmic, automobile, chemical, marine, and construction industries.

2. [Description of Related Art]

As fastening members, such as bolts and nuts, fastening members constituted of metals have heretofore been used. However, the fastening members constituted of metals have the drawbacks in that they have a low heat resistance and are heavy in weight. Due to these drawbacks, there has been a limit in using the fastening members constituted of metals in various fields, particularly in the aviation and cosmic industries.

Therefore, a fastening member constituted of a ceramic material, which has a high heat resistance and is light in weight, has been proposed and has attracted particular attention. However, the proposed fastening member constituted of a ceramic material has a low toughness, and therefore has the drawbacks in that cracks are apt to occur and become gradually large in the threads of the fastening member, and the threads break at a stress markedly lower than the strength of the material. For these reasons, the proposed fastening member constituted of a ceramic material cannot be applied to sites, which are required to have a high strength. Thus a need exists for a fastening member, which has a high heat resistance and a high mechanical strength and is light in weight.

SUMMARY OF THE INVENTION

The object of the present invention is to provide a fastening member, which has a high heat resistance and a high mechanical strength and is light in weight.

The inventors carried out extensive research and found that the object can be accomplished by a fastening member formed from a fiber-reinforced ceramic composite material comprising a ceramic material and inorganic long fibers, which are orientated in specific directions and contained in the ceramic material.

The present invention is based on such findings. Specifically, the present invention provides a fastening member formed from a fiber-reinforced ceramic composite material, in which a ceramic material is reinforced with a plurality of inorganic long fibers, wherein the inorganic long fibers are located in the ceramic material such that first orientated layers, in which the inorganic long fibers are orientated in a predetermined direction, and second orientated layers, in which the inorganic long fibers are orientated in a direction different from the direction of orientation of the inorganic long fibers in the first orientated layers, may be laminated alternately.

The present invention also provides a process, which is preferable for producing the fastening member in accordance with the present invention. Specifically, the present invention also provides a process for producing the fastening member, comprising the steps of:

i) embedding a plurality of inorganic long fibers in a ceramic material such that the inorganic long fibers may be orientated in a predetermined direction, a plurality of preforms being thereby formed, ii) laminating the obtained preforms such that the directions of orientation of the inorganic long fibers in adjacent preforms may intersect each other at a predetermined angle, iii) sintering the laminated preforms, a fiber-reinforced ceramic composite material being thereby obtained, iv) cutting a piece with a predetermined directivity from the obtained fiber-reinforced ceramic composite material, and v) shaping the cut piece, the fastening member being thereby obtained.

The fastening member in accordance with the present invention has a high heat resistance and a high mechanical strength and is light in weight.

Therefore, the fastening member in accordance with the present invention is applicable to sites, to which the conventional fastening members constituted of metals could not be satisfactorily used due to their low heat resistance. Thus the fastening member in accordance with the present invention are useful in various fields.

DETAILED DESCRIPTION OF THE INVENTION

Figure 1A:
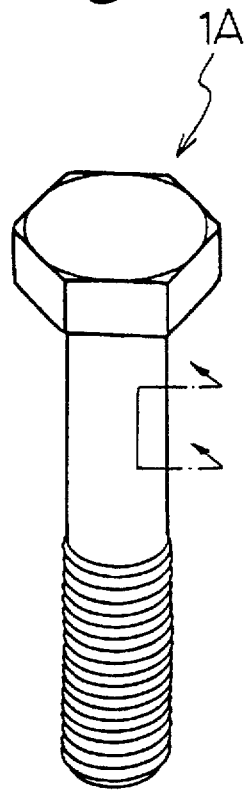
FIG. 1(a) is a perspective view showing an embodiment of the fastening member in accordance with the present invention, which is constituted as an external thread member.

Examples of the inorganic long fibers utilized in the present invention include inorganic long fibers having a composition of silicon (Si), titanium (Ti) and/or zirconium (Zr), carbon (C), and oxygen (O). Specifically, the inorganic long fibers should preferably be constituted of (a) an amorphous substance substantially comprising Si, Ti and/or Zr, C, and O, (b) an aggregate of the amorphous substance described above and a crystalline substance of 500 Å or less comprising β-SiC, and TiC and/or ZrC, or (c) a mixture system of the crystalline substance described above and an amorphous substance, which comprises $SiO_x$, and $TiO_x$ and/or $Zro_x$ ($0<x\leq2$) and is present in the vicinity of the crystalline substance.

The vicinity in (c) above is preferably the region at a distance of 1,000 Å or less from the crystalline particles.

The proportions of the elements in the inorganic long fibers specifically exemplified above should preferably be such that the proportion of Si may be 45 to 60 wt %, the proportion of Ti and/or Zr may be 0.2 to 5 wt %, the proportion of C may be 20 to 45 wt %, and the proportion of O may be 0.1 to 20.0 wt %.

As the inorganic long fibers having the composition described above, commercially available products, such as the product available under the trade name of Tyranno Fiber and supplied by Ube Industries, Ltd., may be used.

As the inorganic long fibers described above, besides the inorganic long fibers having the compositions described above, it is possible to use silicon nitride fibers, silicon carbide fibers, alumina fibers, zirconia fibers, carbon fibers, or the like.

Also, the inorganic long fibers described above should preferably have an inclined composition structure, in which the outermost surface layer of each fiber has a composition comprising 20 to 100 wt % of C, 0 to 60 wt % of Si, 0 to 4 wt % of Ti, and 0 to 19 wt % of O, and the proportions of C, Si, Ti, and O change continuously from the outermost surface layer to the inner side of each fiber within the range of 20 to 20,000 Å.

The rate of gradient in the gradient composition structure may be adjusted as being a linear change in the rate of gradient, a curvilinear change in the rate of gradient, or a linear-curvilinear composite change in the rate of gradient in so far as the proportions of the elements change continuously.

Each of the inorganic long fibers may take one of various shapes, such as a circular cylinder shape, a cylindrical tube shape, a prismatic shape, and a prismatic tube shape, and may be shaped with one of known methods.

Also, the mean diameter (i.e., the length in the width direction) of the inorganic long fibers should preferably be 5 to 200 µm, and the mean length (i.e., the length in the longitudinal direction) of the inorganic long fibers should preferably be at least 500 µm.

The density of the inorganic long fibers falls within the range of 2.2 to 3.2 g/cm³.

Preferable examples of the ceramic materials, which may be used in the present invention, include glass-ceramics, carbides, nitrides, borides, and oxides. Among the above-enumerated ceramic materials, the glass-ceramics are more preferable.

Preferable examples of the glass-ceramics include the glass-ceramics of the $Li_2O-Al_2O_3-MgO-SiO_2-Nb_2O_5$ type, the $MgO-Al_2O_3-SiO_2$ type, the $BaO-Al_2O_3-SiO_2$ type, the $BaO-MgO-Al_2O_3-SiO_2$ type, and the $CaO-Al_2O_3-SiO_2$ type, which can be used independently or as a mixture.

The glass-ceramics of the types described above may further contain Group-II metal oxides, Group-III metal oxides, Group-IV metal oxides, and/or Group-V metal oxides.

Ordinarily, the densities of the glass-ceramics fall within the range of 2.0 to 3.2 g/cm³.

In the glass-ceramics described above, the amorphous portions and/or the primary crystalline phases of each of the aforesaid compositions should preferably comprise the crystalline portions of anorthite, β-spodumene, cordierite, barium osmilite, mullite, celsian, or the like.

The fastening member in accordance with the present invention is formed from the fiber-reinforced ceramic composite material, in which the ceramic material described above is reinforced with the plurality of the inorganic long fibers described above. The inorganic long fibers are located in the ceramic material such that the first orientated layers, in which the inorganic long fibers are orientated in a predetermined direction, and the second orientated layers, in which the inorganic long fibers are orientated in a direction different from the direction of orientation of the inorganic long fibers in the first orientated layers, may be laminated alternately.

In the fastening member in accordance with the present invention, the volume content of the inorganic long fibers should preferably be 20 to 80 vol %, and the volume content of the ceramic material should preferably be 80 to 20 vol %. If the volume content of the inorganic long fibers is lower than 20 vol %, the fibers will be dispersed nonuniformly, and therefore the composite material cannot have a sufficiently high strength. If the volume content of the inorganic long fibers is higher than 80 vol %, there will be the risk that the adjacent fibers come into contact with one another, and therefore the composite material cannot have a sufficiently high strength.

In each of the first orientated layers, the respective inorganic long fibers are located such that they may be parallel with one another along the longitudinal direction of each fiber and may form a straight line along the width direction of each fiber. As the aforesaid predetermined direction, along which the inorganic long fibers are orientated in the first orientated layers, an arbitrary direction may be employed in so far as the inorganic long fibers are located along the same direction. Also, the intervals, at which the inorganic long fibers are located in each of the first orientated layers (i.e., the intervals of the fibers taken along the width direction of each fiber), should preferably be 0.1 to 500 µm.

Also, in each of the second orientated layers, the respective inorganic long fibers are located such that they may be parallel with one another along the longitudinal direction of each fiber and may form a straight line along the width direction of each fiber. As the aforesaid different direction, along which the inorganic long fibers are orientated in the second orientated layers, an arbitrary direction may be employed in so far as the inorganic long fibers are located along the same direction and in so far as the employed direction is different from the direction of orientation of the inorganic long fibers in the first orientated layers. The intervals, at which the inorganic long fibers are located in each of the second orientated layers (i.e., the intervals of the fibers taken along the width direction of each fiber), should preferably be 0.1 to 500 µm.

As described above, the first orientated layers and the second orientated layers are laminated alternately. This means that the layers are laminated such that a first orientated layer may not be overlaid directly upon a first orientated layer, or a second orientated layer may not be overlaid directly upon a second orientated layer. Therefore, in the fastening member in accordance with the present invention, in so far as a first orientated layer is not overlaid directly upon a first orientated layer, or a second orientated layer is not overlaid directly upon a second orientated layer, the other kinds of orientated layers may be located in addition to the first orientated layers and the second orientated layers.

Embodiments of the fastening member in accordance with the present invention will be described hereinbelow with reference to FIGS. 1(a), 1(b) and FIGS. 2(a) and 2(b).

Figure 1B:
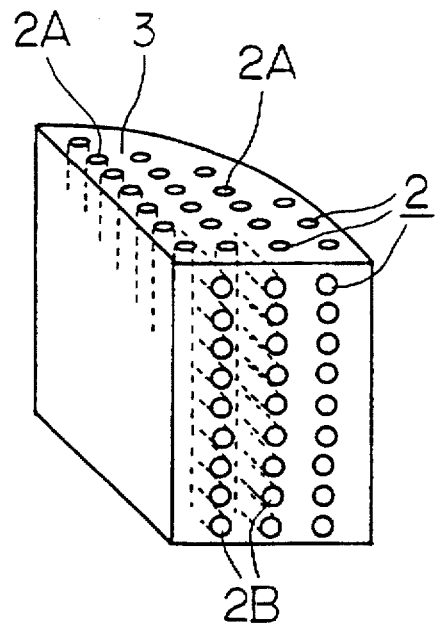
FIG. 1(b) is an enlarged perspective view showing part of the external thread member of FIG. 1(a)

FIG. 1(a) is a perspective view showing an embodiment of the fastening member in accordance with the present invention, which is constituted as an external thread member. FIG. 1(b) is an enlarged perspective view showing part of the external thread member of FIG. 1(a).

Figure 2A:
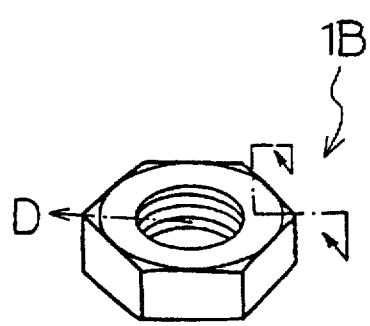
FIG. 2(a) is a perspective view showing a different embodiment of the fastening member in accordance with the present invention, which is constituted as an internal thread member.
Figure 2B:
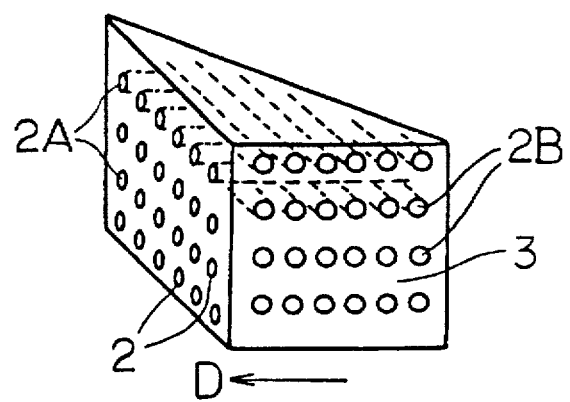
FIG. 2(b) is an enlarged perspective view showing part of the internal thread member of FIG. 2(a)

FIG. 2(a) is a perspective view showing a different embodiment of the fastening member in accordance with the present invention, which is constituted as an internal thread member. FIG. 2(b) is an enlarged perspective view showing part of the internal thread member of FIG. 2(a).

With reference to FIGS. 1(a) and 1(b), an external thread member 1A, which serves as an embodiment of the fastening member in accordance with the present invention, is formed from a fiber-reinforced ceramic composite material 20 (cf. FIG. 5), in which a ceramic material 3 is reinforced with a plurality of inorganic long fibers 2. The inorganic long fibers 2 are located in the ceramic material 3 such that first orientated layers 2A in which the inorganic long fibers 2 are orientated in a predetermined direction, and second orientated layers 2B in which the inorganic long fibers 2 are orientated in a direction different from the direction of orientation of the inorganic long fibers 2 in the first orientated layers 2A may be laminated alternately.

The outer shape of the external thread member 1A is the same as the outer shape of an ordinary known external thread member.

In the external thread member 1A shown in FIGS. 1(a) and 1(b), the direction (i.e., the aforesaid predetermined direction) of orientation of the inorganic long fibers 2 in the first orientated layers 2A should preferably fall within the range of 0° to 90° with respect to the longitudinal direction of the external thread member 1A. In this embodiment, the first orientated layers 2A are located such that the longitudinal direction of each of the inorganic long fibers 2 may be orientated in the 0° direction with respect to the longitudinal direction of the external thread member 1A.

Also, in the external thread member 1A shown in FIGS. 1(a) and 1(b), the direction (i.e., the aforesaid different direction) of orientation of the inorganic long fibers 2 in the second orientated layers 2B should preferably fall within the range of 0° to 90° with respect to the width direction of the external thread member 1A. In this embodiment, the second orientated layers 2B are located such that the longitudinal direction of each of the inorganic long fibers 2 may be orientated in the 0° direction with respect to the width direction of the external thread member 1A.

In this embodiment, the first orientated layers 2A and the second orientated layers 2B are located in parallel with each other and along the longitudinal direction of the external thread member 1A. Alternatively, the first orientated layers 2A and the second orientated layers 2B may be inclined respectively at an angle falling within the range of 0.1° to 90° with respect to the longitudinal direction of the external thread member 1A. In such cases, however, the first orientated layers 2A and the second orientated layers 2B laminated alternately should preferably be in parallel.

In this embodiment, the first orientated layers 2A and the second orientated layers 2B are located such that the angle, at which the directions of orientation in both layers intersect each other, may be equal to 90°. However, in the external thread member as shown in FIGS. 1(a) and 1(b), the angle, at which the directions of orientation in both layers intersect each other, is not limited to 90°. The first orientated layers 2A and the second orientated layers 2B may be located such that the angle, at which the directions of orientation in both layers intersect each other, may be 0° to 89.9°. The interval between a first orientated layer 2A and the adjacent second orientated layer 2B should preferably be 0.1 to 500 μm.

The aforesaid external thread member serving as the embodiment of the fastening member in accordance with the present invention is formed such that the layers, in which the longitudinal direction of each of the inorganic long fibers is orientated in the longitudinal direction (i.e., the axial direction) of the external thread member, and the layers, in which the longitudinal direction of each of the inorganic long fibers is orientated in the width direction (i.e., the thread direction) of the external thread member, are respectively present in the external thread member. Therefore, the fastening member has a high strength with respect to the tensile stress received in use and has a high shearing force.

With reference to FIGS. 2(a) and 2(b), an internal thread member 1B, which serves as a different embodiment of the fastening member in accordance with the present invention, is formed from a fiber-reinforced ceramic composite material 20, in which a ceramic material 3 is reinforced with a plurality of inorganic long fibers 2. The inorganic long fibers 2 are located in the ceramic material 3 such that first orientated layers 2A in which the inorganic long fibers 2 are orientated in a predetermined direction, and second orientated layers 2B, in which the inorganic long fibers 2 are orientated in a direction different from the direction of orientation of the inorganic long fibers 2 in the first orientated layers 2A may be laminated alternately.

The outer shape of the internal thread member 1B is the same as the outer shape of an ordinary known internal thread member.

In the internal thread member 1B shown in FIGS. 2(a) and 2(b), the direction of orientation of the inorganic long fibers 2 in the first orientated layers 2A should preferably fall within the range of 0° to 90° with respect to one diameter direction of the internal thread member 1B (i.e., with respect to the direction indicated by the arrow D in FIG. 2(a)). In this embodiment, the first orientated layers 2A are located such that the longitudinal direction of each of the inorganic long fibers 2 may be orientated in the 0° direction with respect to the one diameter direction of the internal thread member 1B.

Also, in the internal thread member 1B shown in FIGS. 2(a) and 2(b), the direction of orientation of the inorganic long fibers 2 in the second orientated layers 2B is different from the direction of orientation of the inorganic long fibers 2 in the first orientated layers 2A and should preferably fall within the range of 0° to 90° with respect to the one diameter direction of the internal thread member 1B. In this embodiment, the second orientated layers 2B are located such that the longitudinal direction of each of the inorganic long fibers 2 may be orientated in the 90° direction with respect to the one diameter direction of the internal thread member 1B.

In this embodiment, the first orientated layers 2A and the second orientated layers 2B are located in parallel with each other and along the one diameter direction of the internal thread member 1B. Alternatively, the first orientated layers 2A and the second orientated layers 2B may be inclined respectively at an angle falling within the range of 0° to 90° with respect to the one diameter direction of the internal thread member 1B. In such cases, however, the first orientated layers 2A and the second orientated layers 2B laminated alternately should preferably be in parallel.

In this embodiment, the first orientated layers 2A and the second orientated layers 2B are located such that the angle, at which the directions of orientation in both layers intersect each other, may be equal to 90°. However, in the internal thread member as shown in FIGS. 2(a) and 2(b), the angle, at which the directions of orientation in both layers intersect each other, is not limited to 90°. The first orientated layers 2A and the second orientated layers 2B should preferably be located such that the angle, at which the directions of orientation in both layers intersect each other, may be 0° to 90°. The interval between a first orientated layer 2A and the adjacent second orientated layer 2B should preferably be 0.1 to 500 μm.

The aforesaid internal thread member serving as the embodiment of the fastening member in accordance with the present invention is formed such that the layers, in which the longitudinal direction of each of the inorganic long fibers is orientated in the 0° direction with respect to the one diameter direction of the internal thread member, and the layers, in which the longitudinal direction of each of the inorganic long fibers is orientated in the 90° direction with respect to one diameter direction (i.e., in the thread direction) of the internal thread member, are respectively present in the internal thread member. Therefore, the fastening member has a high strength with respect to the compression stress received in use and has a high shearing force.

In the embodiments described above, the fastening member in accordance with the present invention is constituted as the external thread member and the internal thread member. However, the fastening member in accordance with the present invention is not limited thereto. The fastening member in accordance with the present invention is also applicable to, for example, shear pins, clevis pins, and screw parts, such as washers.

An embodiment of the process for producing the fastening member in accordance with the present invention will be described hereinafter.

The process for producing the fastening member in accordance with the present invention can be carried out by successively carrying out steps (1), (2), and (3) described below.

(1) The step of embedding a plurality of inorganic long fibers in a ceramic material such that the inorganic long fibers may be orientated in a predetermined direction, a plurality of preforms being thereby formed.

(2) The step of laminating the preforms, which have been obtained from the step (1), such that the directions of orientation of the inorganic long fibers in adjacent preforms may intersect each other at a predetermined angle, and sintering the laminated preforms, a fiber-reinforced ceramic composite material being thereby obtained.

(3) The step of cutting a piece with a predetermined directivity from the obtained fiber-reinforced ceramic composite material, and shaping the cut piece, the fastening member being thereby obtained.

The steps (1), (2), and (3) will be described hereinbelow with reference to FIGS. 3, 4, 5, and 6.

Figure 3:
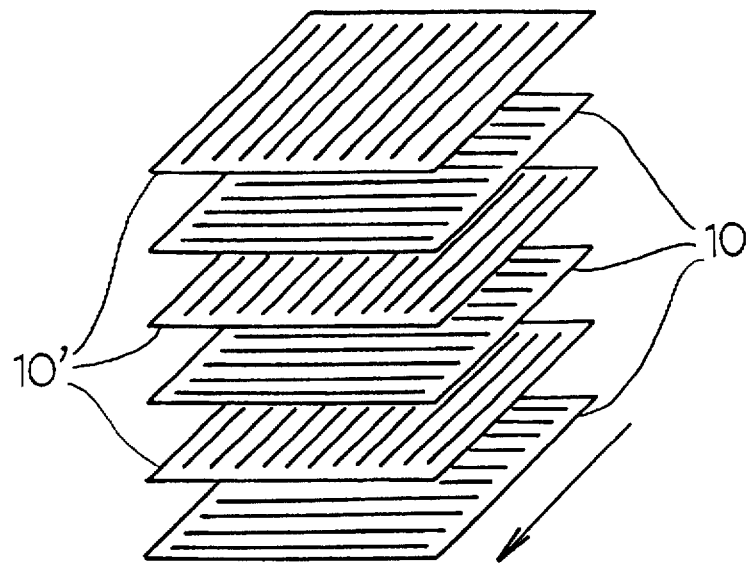
FIG. 3 is a perspective view showing preforms utilized for the fastening member in accordance with the present invention.
Figure 4:
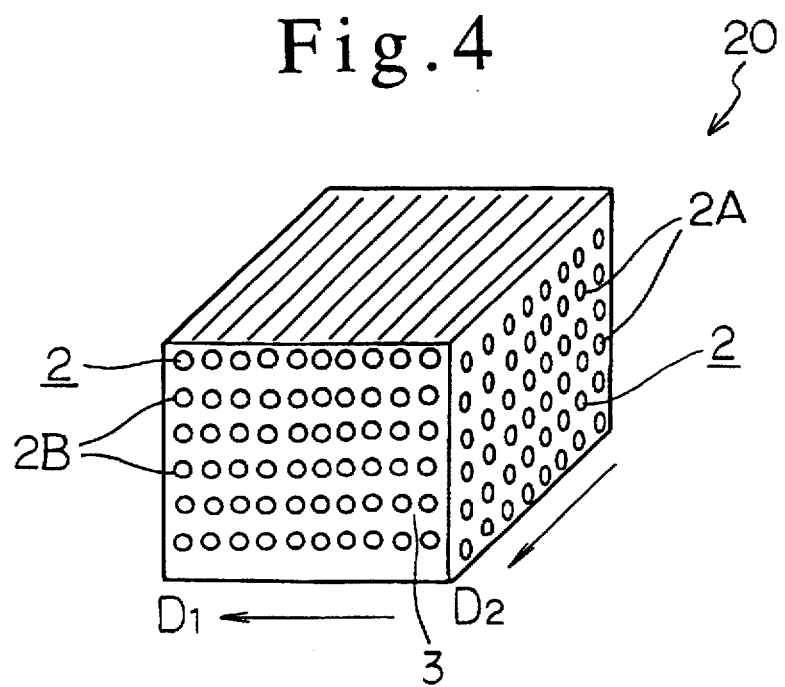
FIG. 4 is a perspective view showing a fiber-reinforced ceramic composite material utilized for the fastening member in accordance with the present invention.
Figure 5:
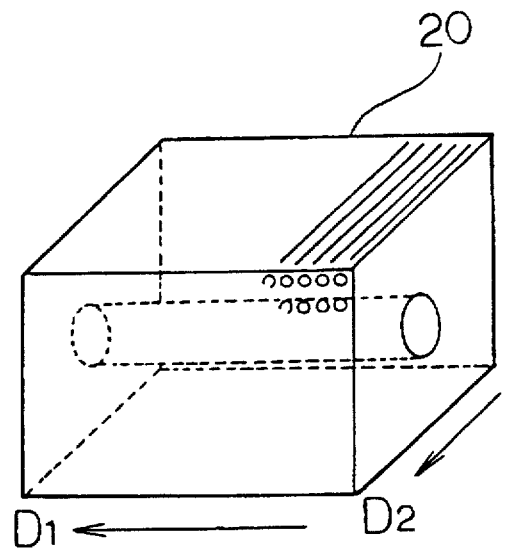
FIG. 5 is a schematic perspective view showing a direction, in which an external thread member serving as an embodiment of the fastening member in accordance with the present invention is cut from a fiber-reinforced ceramic composite material.
Figure 6:
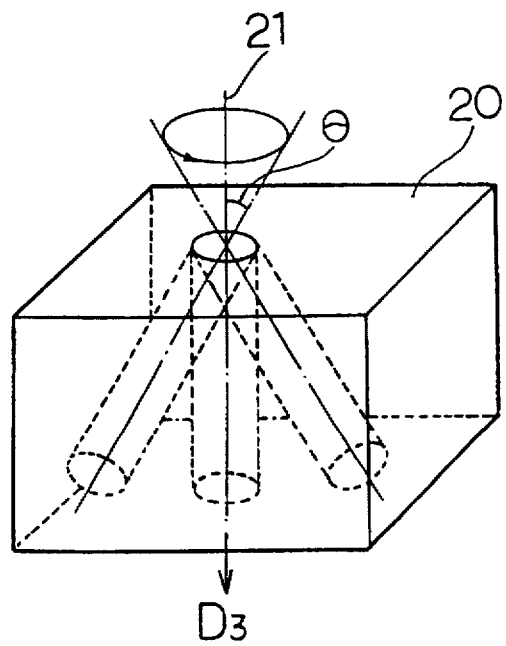
FIG. 6 is a schematic perspective view showing a direction, in which an internal thread member serving as an embodiment of the fastening member in accordance with the present invention is cut from a fiber-reinforced ceramic composite material.

FIG. 3 is a perspective view showing how the preforms utilized for the fastening member in accordance with the present invention are laminated. FIG. 4 is a perspective view showing a fiber-reinforced ceramic composite material utilized for the fastening member in accordance with the present invention. FIG. 5 is a schematic perspective view showing a direction, in which an external thread member serving as an embodiment of the fastening member in accordance with the present invention is cut from the fiber-reinforced ceramic composite material. FIG. 6 is a schematic perspective view showing a direction, in which an internal thread member serving as an embodiment of the fastening member in accordance with the present invention is cut from the fiber-reinforced ceramic composite material.

Though not shown, the step (1) described above can be carried out with a known method, except that the respective inorganic long fibers are embedded in the ceramic material such that they may be parallel with one another along the longitudinal direction of each fiber and may form a straight line along the width direction of each fiber, and such that the first orientated layers and the second orientated layers can be formed. Specifically, as the predetermined direction described above for the step (1), an arbitrary direction may be employed which is parallel to the longitudinal direction of each of the inorganic long fibers.

The step (2) described above can be carried out in the manner shown in FIGS. 3 and 4. Specifically, firstly, as shown in FIG. 3, preforms 10 and preforms 10' having been obtained from the step (1) described above are laminated alternately such that the directions of orientation of the inorganic long fibers 2 in adjacent preforms 10 and 10' may intersect each other at an angle (in FIG. 3, 90°), which falls within the preferable range of the angle of intersection described above. In this manner, a laminate of the preforms 10 and preforms 10' is obtained. Thereafter, the laminate is sintered, and a fiber-reinforced ceramic composite material 20 shown in FIG. 4 is thereby obtained. In the fiber-reinforced ceramic composite material 20, the first orientated layers 2A in which the longitudinal direction of each of the inorganic long fibers 2 is orientated in a predetermined direction (i.e., in the direction indicated by the arrow $D_1$ in FIG. 4), and the second orientated layers 2B in which the longitudinal direction of each of the inorganic long fibers 2 is orientated in a direction (i.e., in the direction indicated by the arrow $D_2$ in FIG. 4) different from the direction of orientation of the inorganic long fibers 2 in the first orientated layers 2A, are laminated alternately. The sintering may be carried out with an HIP method, a hot pressing method, or the like. Of these methods, the HIP method is particularly preferable. With the HIP method, the sintering may be carried out under the conditions of a temperature of 900° to 2,100° C., a pressure of 50 to 3,000 kg/cm², a time span of 1 minute to 10 days. The term "predetermined direction" and the term "different direction" as used herein for the thus obtained fiber-reinforced ceramic composite material 20 are the same as those described above.

The step (3) described above can be carried out, for example, in the manner shown in FIG. 5 or FIG. 6. Specifically, in cases where the external thread member 1A described above is to be produced, as illustrated in FIG. 5, a piece having a circular cylinder shape is cut along the $D_1$ direction (i.e., the horizontal direction with respect to the laminating direction) from the fiber-reinforced ceramic composite material 20. The cut piece (not shown) having the circular cylinder shape is then shaped into the external thread member 1A.

The aforesaid cutting can be carried out with a cutting method or a grinding method.

The shaping of the external thread member may be carried out with a wet type of grinding method using a thread grinder, or the like. The shaping may be carried out under the conditions of a wheel rotation speed of 1,000 to 1,800 rpm, a depth of cut of 0.01 to 0.1 mm, and a workpiece rotation speed of 6 to 16 rpm.

In cases where the internal thread member 1B described above is to be produced, as illustrated in FIG. 6, a piece having a circular cylinder shape is cut along the $D_3$ direction (i.e., the height direction or the direction perpendicular to the aforesaid $D_1$ or $D_2$ direction) from the fiber-reinforced ceramic composite material 20. The cut piece (not shown) having the circular cylinder shape is then shaped into the internal thread member 1B.

The aforesaid cutting can be carried out with a cutting method or a grinding method.

The shaping of the internal thread member may be carried out with a wet type of grinding method using, for example, a three-axis simultaneous control milling machine fitted with an annular angular grinding tool having no lead angle. The shaping may be carried out under the conditions of a spindle rotation speed of 6,000 to 12,000 rpm, a depth of cut of 0.01 to 0.05 mm, and a feed rate of 100 to 150 mm/min.

The aforesaid cutting of the piece for the internal thread member 1B may be carried out along a direction other than the aforesaid $D_3$ direction. In such cases, it is necessary for the cutting direction to be such that the angle θ with respect to the aforesaid $D_3$ direction may be ±30° or less. If the angle θ is larger than ±30°, peeling between laminated layers will readily occur, and the strength required for the member cannot be obtained sufficiently.

The present invention will further be illustrated by the following nonlimitative examples.

EXAMPLES

The direction indicated by the arrow in FIG. 3 was taken as 0°, and preforms, in which the longitudinal direction of each of inorganic long fibers was orientated in the 0° direction, and preforms, in which the longitudinal direction of each of inorganic long fibers was orientated in the 90° direction, were laminated alternately. Thereafter, the thus obtained laminate was sintered with the HIP method at a temperature of 1,300° C. and a pressure of 100 kg/cm² for one hour. In this manner, a fiber-reinforced ceramic composite material shown in FIG. 4 was obtained. In the fiber-reinforced ceramic composite material, the product available under the trade name of Tyranno Fiber and supplied by Ube Industries, Ltd. was used as the inorganic long fibers, and glass-ceramics having the composition of BaO—MgO—$Al_2O_3$—$SiO_2$ was used as the ceramic material.

A round bar stock was cut from the obtained fiber-reinforced ceramic composite material. The cutting was carried out in the horizontal direction with respect to the aforesaid laminating direction. The round bar stock was then shaped, and the external thread member (having a size of M10×40, 40 representing the length under the head) shown in FIGS. 1(a) and 1(b) was thereby obtained.

Also, a fiber-reinforced ceramic composite material was obtained in the same manner as that described above, and a round bar stock was cut from the obtained fiber-reinforced ceramic composite material. The cutting was carried out in the perpendicular direction with respect to the aforesaid laminating direction. The round bar stock was then shaped, and the internal thread member (having a size of M10×14, 14 representing the nut height) shown in FIGS. 2(a) and 2(b) was thereby obtained.

The shaping of the external thread member was carried out with the grinding method. The grinding was carried out with the wet method under the conditions of a wheel rotation speed of 1,000 rpm, a depth of cut of 0.05 mm, and a workpiece rotation speed of 9.5 rpm.

The shaping of the internal thread member was carried out with a wet method using a three-axis simultaneous control milling machine and an annular angular grinding tool having no lead angle. The shaping was carried out under the conditions of a spindle rotation speed of 6,000 rpm, a depth of cut of 0.03 mm, and a feed rate of 90 mm/min.

As for the obtained M10×1.5 external thread member and internal thread member, tensile tests were carried out and the loads at break were measured according to MIL-STD1312. The load at break of the external thread member was 13.7 KN (1,400 kgf), and the load at break of the internal thread member was 98 KN (10,000 kgf).

The aforesaid measurement for the external thread member was carried out by setting an internal thread member, which was constituted of an alloy steel (AISI4130) having a height of 10 mm, to the thread portion of the external thread member. Also, the aforesaid measurement for the internal thread member was carried out by setting an external thread member, which was constituted of a bearing steel (SUJ2) having a thread length of 25 mm, to the internal thread member having a height of 14 mm.

COMPARATIVE EXAMPLE

For comparison, a bolt (thread size M10×1.5) constituted of only $Si_3N_4$ was prepared. As for the bolt, the tensile load at break was measured in the same manner as that in the Examples described above. The tensile load at break of the bolt was 3.8 kN (390 kgf).

What is claimed is:

1. A fastening member comprising: a fiber-reinforced ceramic composite material, in which a ceramic material is reinforced with a plurality of inorganic long fibers, said ceramic material comprising glass-ceramics having a density ranging from 2.0 to 3.2 g/cm³, and being selected from the group consisting of $Li_2O$—$Al_2$—MgO—$SiO_2$—$Nb_2O_5$, MgO—$Al_2$—$SiO_2$, BaO—MgO—$Al_2O_3$—$SiO_2$, and CaO—$Al_2O_2O_3$—$SiO_2$, said inorganic long fibers having a mean diameter ranging from 5 to 200 μm, a mean length of at least 500 μm, and a density ranging from 2.2 to 3.2 g/cm³, wherein said inorganic long fibers are located in said ceramic material such that first orientated layers, in which said inorganic long fibers are orientated in a predetermined direction, and second orientated layers, in which said inorganic long fibers are orientated in a direction different from the direction of orientation of said inorganic long fibers in said first orientated layers, are laminated alternately, said fastening member having a length and a width, said length extending in a longitudinal direction and including an external thread, the direction of orientation of said inorganic long fibers in said first orientated layers ranging between 0° and 90° with respect to the longitudinal direction of said external thread, and the direction of orientation of said inorganic long fibers in said second orientated layers ranging between 0° and 90° with respect to the width of said fastening member.

2. The fastening member recited in claim 1, wherein the inorganic long fibers are constituted of (a) an amorphous substance substantially comprising Si, Ti and/or Zr, C, and O, (b) an aggregate of said amorphous substance and a crystalline substance of 500 Å or less comprising β-SiC, and TiC and/or ZrC, or (c) a mixture system of said crystalline substance and an amorphous material, which comprises $SiO_x$, and $TiO_x$ and/or $ZrO_x$ (0<x≤2) and is present at a distance of 1,000 Å from the crystalline substance.

3. The fastening member recited in claim 2, wherein the inorganic long fibers are such that the proportion of Si is 45 to 60 wt %, the proportion of Ti and/or Zr is 0.2 to 5 wt %, the proportion of C is 20 to 45 wt %, and the proportion of O is 0.1 to 20.0 wt %.

4. A fastening member comprising: a fiber-reinforced ceramic composite material, in which a ceramic material is reinforced with a plurality of inorganic long fibers, said ceramic material comprising glass-ceramics having a density ranging from 2.0 to 3.2 g/cm³, and being selected from the group consisting of $Li_2O$—$Al_2O_3$—$MgO$—$SiO_2$—$Nb_2O_5$, $MgO$—$Al_2O_3$—$SiO_2$, $BaO$—$Al_2O_3$—$SiO_2$, $BaO$—$MgO$—$Al_2O_3$—$SiO_2$, and $CaO$—$Al_2O_2O_3$—$SiO_2$, said inorganic long fibers having a mean diameter ranging from 5 to 200 μm, a mean length of at least 500 μm, and a density ranging from 2.2 to 3.2 g/cm₃, wherein said inorganic long fibers are located in said ceramic material such that first orientated layers, in which maid inorganic long fibers are orientated in a predetermined direction, and second orientated layers, in which said inorganic long fibers are orientated in a direction different from the direction of orientation of said inorganic long fibers in said first orientated layers, are laminated alternately, said fastening member having a length and a width, said length extending in a longitudinal direction and including an external thread, the direction of orientation of said inorganic long fibers in said first orientated layers ranging from 0° and 90° with respect to said width of said fastening member, and the direction of orientation of said inorganic long fibers in said second orientated layers ranging from 0° and 90° with respect to said width of said fastening member.

5. The fastening member recited in claim 4, wherein the inorganic long fibers are constituted of (a) an amorphous substance substantially comprising Si, Ti and/or Zr, C, and O, (b) an aggregate of said amorphous substance and a crystalline substance of 500 Å or less comprising β-SiC, and TiC and/or ZrC, or (c) a mixture system of said crystalline substance and an amorphous material, which comprises $SiO_x$, and $TiO_x$ and/or $ZrO_x$ ($0<x\leq2$) and is present at a distance of 1.000 Å from the crystalline substance.

6. The fastening member recited in claim 5, wherein the inorganic long fibers are such that the proportion of Si is 45 to 60 wt %, the proportion of Ti and/or Zr is 0.2 to 5 wt %, the proportion of C is 20 to 45 wt %, and the proportion of O is 0.1 to 20.0 wt %.

7. A process for producing a fastening member, comprising the steps of:

i) embedding a plurality of inorganic long fibers in a ceramic material such that the inorganic long fibers are orientated in a predetermined direction, thereby obtaining a plurality of preforms, said ceramic material comprising glass-ceramics having a density ranging from 2.0 to 3.2 g/cm³, and being selected from the group consisting of $Li_2O$—$Al_2O_3$—$MgO$—$SiO_2$—$Nb_2O_5$, $MgO$—$Al_2O_3$—$SiO_2$, $BaO$—$Al_2O_3$—$SiO_2$ type, $BaO$—$MgO$—$Al_2O_3$—$SiO_2$, and $CaO$—$Al_2O_2O_3$—$SiO_2$, said inorganic long fibers having a mean diameter ranging from 5 to 200 μm, a mean length of at least 500 μm, and a density ranging from 2.2 to 3.2 g/cm³, ii) laminating the obtained preforms such that the directions of orientation of the inorganic long fibers in adjacent preforms intersect each other an a predetermined angle, iii) sintering the laminated preforms to obtain a fiber-reinforced ceramic composite material, iv) cutting a piece with a predetermined directivity from the obtained fiber-reinforced ceramic composite material, and v) shaping the cut piece to obtain a fastening member having a thread.

* * * * *